April 20, 1943.    G. F. SALISBURY    2,317,088
COUPLING FOR LINEMEN'S PROTECTIVE DEVICES
Filed Sept. 25, 1941    2 Sheets-Sheet 2
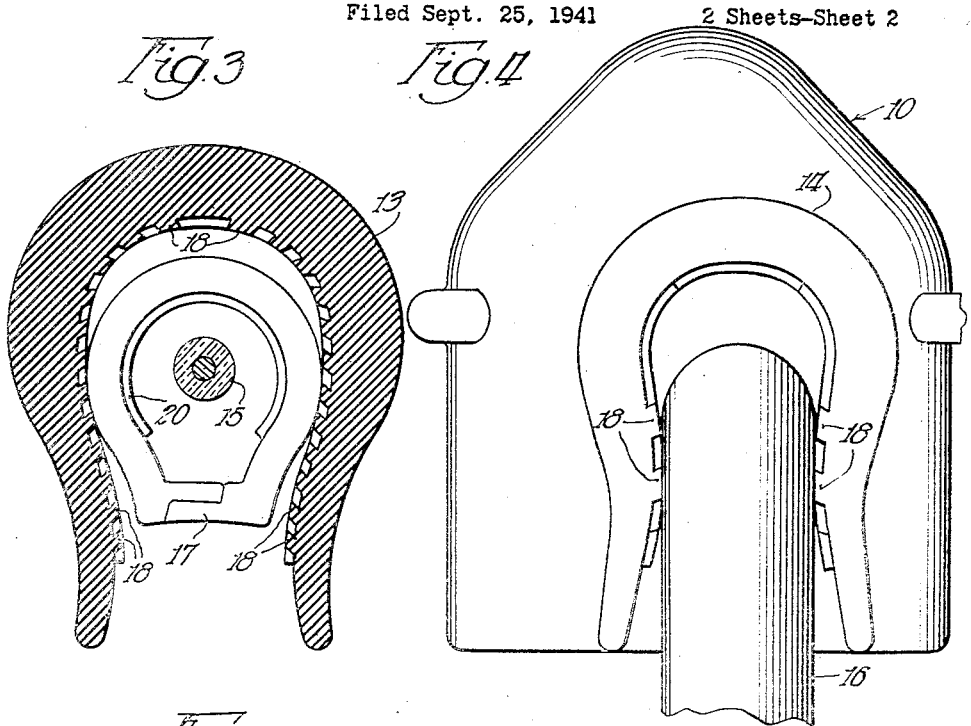
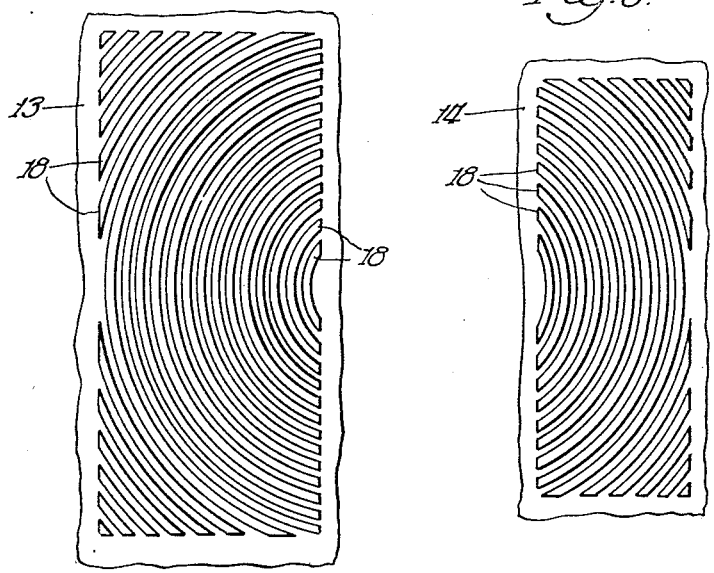
Inventor
George F. Salisbury
By: Zabel, Carlson, Greybaugh & Wells
Attys.

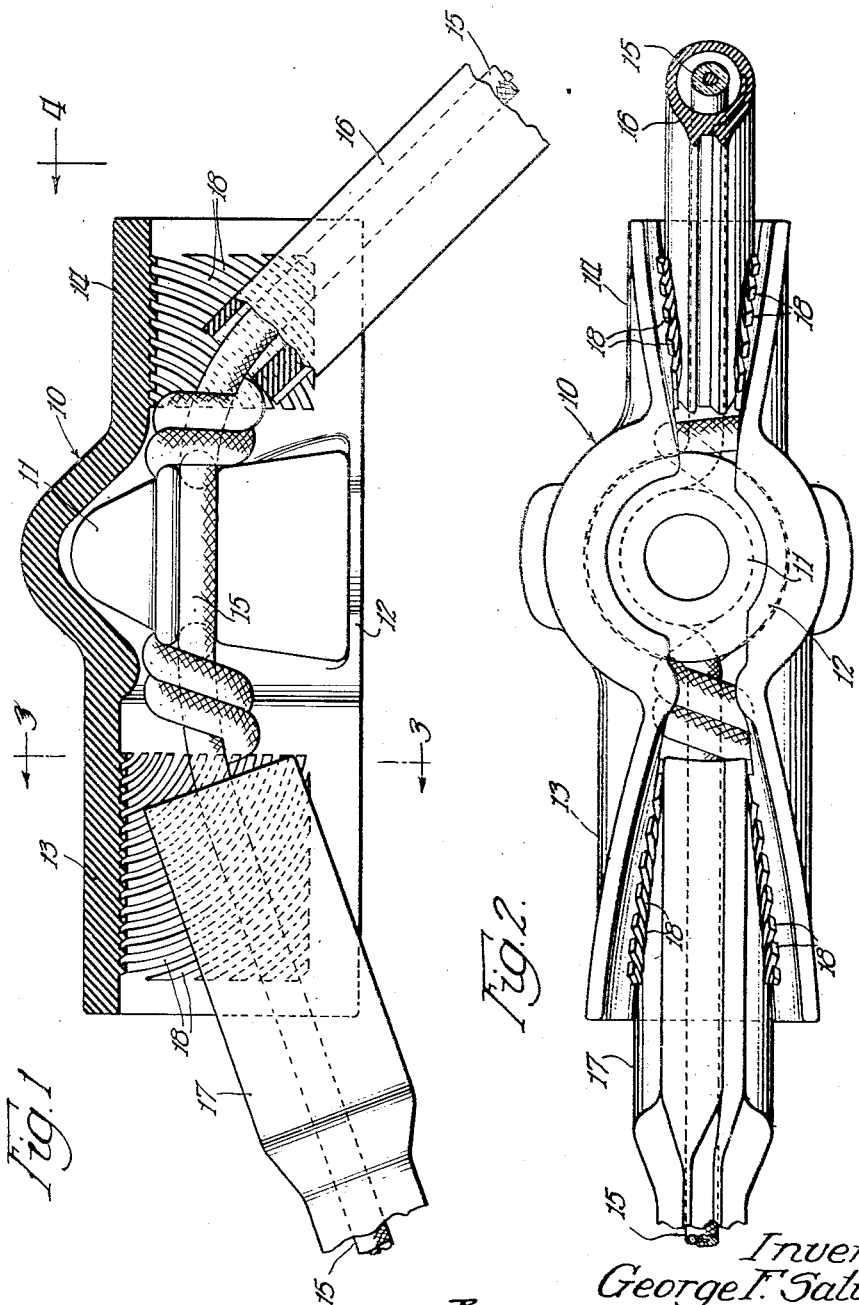

Patented Apr. 20, 1943

2,317,088

UNITED STATES PATENT OFFICE 2,317,088

COUPLING FOR LINEMEN'S PROTECTIVE DEVICES

George F. Salisbury, Kenilworth, Ill., assignor to W. H. Salisbury & Co., Chicago, Ill., a corporation of Illinois Application September 25, 1941, Serial No. 412,245

3 Claims. (Cl. 174—5)

The present invention relates to couplings designed to prevent the inadvertent separation of two adjoining members. It particularly is useful in coupling protective devices that are used as temporary covers for live parts of electrical transmission lines. Such protective devices include insulator hoods, and line hose. They are made of insulating material, preferably rubber, adapted to cover or enclose electrical conductors, insulators and other high tension line parts so as to protect linemen from shock while working in the vicinity of said conductors.

A principal object of the present invention is to provide a coupling whereby two endwise adjoining tubes or tubular devices, such as the protective devices above described, may be prevented from separating inadvertently. For example, two protective devices, such as two pieces of line hose, or an insulator hood and one or more line hose may be coupled together. At the conclusion of the work, the coupled devices conveniently may be separated and successively removed for further use elsewhere.

Frequently an electrical conductor on which work is being done is not maintained taut. Consequently the conductor extends at an angle from the insulator to which it is connected. Often the angle changes from time to time during the course of the work. In this case, the line hose on the conductor must extend at an angle from the protective hood on the insulator. An important object of the invention, therefore, is to provide a couple whereby two protective devices may be coupled and held together in any one of a variety of angular relationships between them such as mentioned above.

The present invention contemplates the use of a tubular length of resilient material associated with one protective device, for example the insulator hood, which length is adapted to receive a tubular end of another protective device such as a length of line hose. The length of resilient material is slit along one side to permit entry of the conductor and to permit the joined device to extend from the length at various angles.

The length of resilient material is provided interiorly with spaced projections which may be in the form of ribs. These projections or ribs are on curves around the interior of the length. The purpose of curving the ribs is to present rib surfaces substantially at right angles to the received end of the inserted device regardless of the angle between the two devices. The ribs are compressed on the received end of the inserted device whereby friction therebetween tends to resist separation of the devices.

Other features and advantages of the present invention will appear more fully as the description proceeds, reference being had to the accompanying drawings wherein a preferred form of the invention is shown. It is to be understood, however, that the drawings and description are illustrative only, and are not to be taken as limiting the invention except insofar as it is limited by the claims.

In the drawings—

Fig. 1 is an elevational view of an insulator hood embodying the present invention and demonstrating the coupling with line hose extending from the hood at different angles;

Fig. 2 is a bottom view of the structure shown in Fig. 1;

Fig. 3 is a sectional view on the line 3—3 of Fig. 1;

Fig. 4 is an end view in the direction of the arrow 4 in Fig. 1;

Fig. 5 is a plane view of the interior of the left-hand length of Fig. 1, the length being flattened out to show the curvature of the ribs; and.

Fig. 6 is a plane view of the interior of the right-hand length of Fig. 1, this length also being flattened out to show the curvature of the ribs.

Referring now to the drawings and particularly to Fig. 1 thereof, an insulator hood is designated generally by the numeral 10. The hood 10 is adapted to be received over an insulator 11 and held in place thereon by means of flanges 12 which bear on the bottom of the insulator. Tubular lengths of insulating and resilient material 13 and 14 extend oppositely from the hood 10 to receive ends of the devices to be coupled with the hood.

The insulator lengths 13 and 14 are slit at the bottoms thereof as shown best in Figs. 2, 3 and 4. The slits in the lengths 13 and 14 permit conductor 15 to be received within the lengths when the hood is placed in position on an insulator. It will be noted that the interior diameters of the lengths 13 and 14 are considerably larger than the size of the conductor 15.

Line hose 16 of the character disclosed in Patent No. 1,485,994 is adapted to enclose conductor 15. The interior diameter of length 14 is of sufficient size to receive the end of line hose 16. The interior diameter of the length 13, as shown, is somewhat larger so that it may receive the enlarged opposite end 17 of another line hose. As will be understood, the tubular lengths 13 and 14 expand somewhat at the slits when the ends of the line hose are inserted therein. The tendency of the resilient material of the lengths to assume normal condition or "recover" results in a gripping of the ends by the lengths through the presently to be described ribs.

The interior surface of the tubular lengths 13 and 14 is provided with spaced ribs 18. The ribs 18 are made of resilient material such as rubber. As is best shown in Figs. 5 and 6, the ribs 18 extend on concentrically circular lines, the center of the circle being at the insulator hood end of the lengths. As will be seen in Fig. 1, the ribs 18 extend on curves across the sides of the length. The ribs 18 are of such internal diameter as to fit snugly and be compressed slightly on the received ends of the line hose. They are inclined toward the center about which they are drawn so as to oppose movement away from the center. The friction caused by the snug fit effectively resists separation of the devices.

Due to the curved structure of the ribs 18, the ribs present surfaces substantially at right angles to the axis of the received end of the line hose regardless of the acute angle existing between the hose and the length. As will be understood, maximum gripping force is exerted by the ribs when surfaces thereof extend at right angles to the axis of the line hose. For example, if the axis of the line hose and the length coincide, the surfaces of the ribs in the upper portion of the length are substantially at right angles to the axis of the line hose. In the case of angles such as shown in Fig. 1, it will be seen that certain other portions of the ribs are substantially at right angles to the hose. Therefore, an effective couple is maintained between the two devices regardless of the angle between them.

The interior of the enlarged end 17 of the line hose is provided with spaced ribs 20 (Fig. 3) to provide a coupling to receive and hold the opposite end of an adjoining line hose. Details of this structure are more fully set forth in my copending application, Coupling for linemen's protective devices, Serial No. 374,511, filed January 15, 1941.

Referring to the sectional views of the ribs in Figs. 1 and 3, it will be noted that the ribs are inclined rearwardly with respect to the inserted line hose. They are provided with substantially parallel front and rear walls and the rearwardly facing walls are substantially flat and concentric with the surface from which the ribs rise. This provision increases the gripping power of the ribs. A pull tending to separate two thusly coupled devices would, because of the friction between the hose and the ribs, tend to draw the ribs upright, with the result that the diameter of the opening is decreased to provide a stronger frictional relationship between the hose and the ribs.

From the above description, it is believed the nature and advantages of the present invention will be readily apparent to those skilled in this art. Having thus described my invention, what I claim as new and desire to secure by Letters Patent is:

1. A coupling for linemen's protective devices comprising a tubular length of resilient material associated with one of said devices and adapted to receive a tubular end of another of said devices, said length being slit along one side, spaced ribs of resilient material on the inside of said length, said ribs extending on curves across the sides of the length whereby to present surfaces substantially at right angles to the axis of the received end of said second device regardless of the acute angle between the said two devices, said ribs being compressible on said received end to resist separation of the devices.

2. A coupling for linemen's protective devices comprising a tubular length of resilient material associated with one of said devices and adapted to receive a tubular end of another of said devices, said length being slit along one side, spaced ribs of resilient material on the inside of said length, said ribs extending at angles across the sides of the length in such a fashion as to present surfaces substantially at right angles to the axis of the received end of said second device regardless of the angle between the said two devices, said ribs being compressed on said received end whereby friction therebetween resists separation of the devices.

3. A coupling for linemen's protective devices, comprising a large tubular length of resilient material associated with one of said devices and adapted to receive therein an end of another of said devices, said length being slit along one side and adapted to be expanded while being placed in position over an electrical transmission line, transverse ribs of resilient material rhomboidal shaped in cross section and attached to the inside of said length, said ribs being spaced apart so that the said ribs can be flattened down by the said inserted end, the said inserted end being larger than the diametrical space inside the ribs when in normal position, said ribs being inclined away from the inserted device whereby friction caused by the engagement of the ribs with the inserted device deflects the ribs inward during the insertion of the inserted device, the resiliency of the ribs and the friction between the ribs and the inserted device serving to cause the ribs to move toward erect position when the inserted device moves outwardly, thereby increasing the pressure between the ribs and the inserted device and effectively holding the couple together.

GEORGE F. SALISBURY.